No. 758,512. PATENTED APR. 26, 1904.
J. A. DOUGLAS & J. BARTLESON.
NUT LOCK.
APPLICATION FILED JAN. 16, 1903.
NO MODEL.
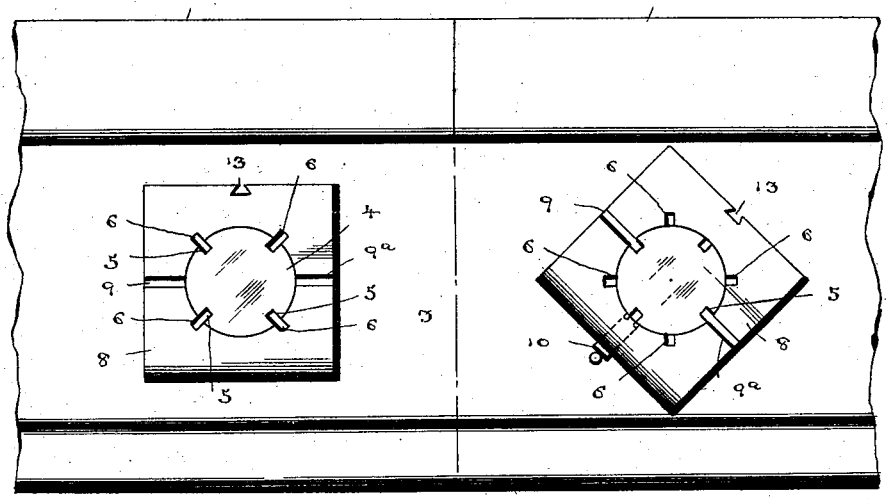
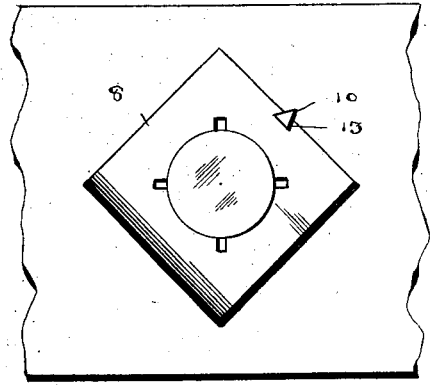
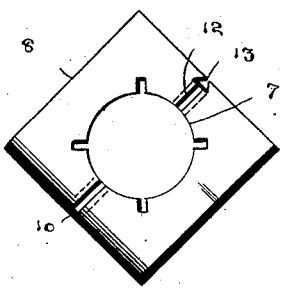
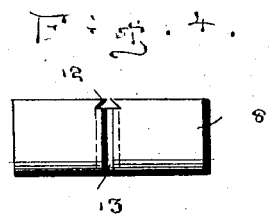
Inventors
James A. Douglas,
James Bartleson.
Witnesses
By Victor J. Evans
Attorney No. 758,512. Patented April 26, 1904.

UNITED STATES PATENT OFFICE.

JAMES A. DOUGLAS AND JAMES BARTLESON, OF YATES LANDING, ILLINOIS.

NUT-LOCK.

SPECIFICATION forming part of Letters Patent No. 758,512, dated April 26, 1904.

Application filed January 16, 1903. Serial No. 139,340. (No model.)

*To all whom it may concern:*

Be it known that we, JAMES A. DOUGLAS and JAMES BARTLESON, citizens of the United States, residing at Yates Landing, in the county of Pulaski and State of Illinois, have invented new and useful Improvements in Nut-Locks, of which the following is a specification.

This invention relates to nut-locks; and the object thereof is to provide an effectual means for securing the nut to a bolt whereby the liability of the nut becoming accidentally loosened on the bolt will be diminished.

Other objects, as well as the novel details of construction, will be specifically set forth in the following description, reference being had to the accompanying drawings, in which—

Figure 1 is a view in elevation of a rail and fish-plate, illustrating two bolts and nuts therefor and showing different methods of locking the nuts to the bolts. Fig. 2 is a top plan view of a nut applied to an ordinary bolt. Fig. 3 is a plan view of the preferred form of nut. Fig. 4 is an elevation view thereof. Fig. 5 is a detail perspective view of the pin.

For the sake of convenience we have illustrated the bolts and nuts as being applied to the fish-plates of a rail-joint, and in Fig. 1 the numerals 1 and 2 designate the abutting ends of two rail-sections secured together by the fish-plate 3. Bolts 4 project through the openings in the rails and fish-plate and are provided with a plurality of equidistantly-arranged longitudinal grooves 5. These grooves register with corresponding grooves 6 in the walls of an opening 7, formed concentrically in the nut 8. When the grooves in the bolt and those in the nut are brought in alinement with each other, suitable pins or keys can be driven into the grooves to securely lock the nut and bolt against relative movement.

Dovetail grooves 9 and $9^a$ are provided in the top face of the nut and are diametrically oppositely arranged, being provided for the reception of corresponding keys or wedge-shaped pins 10. The restricted end $10^a$ of the wedge or pin 10 is formed to coincide with the grooves 5 of the bolt 4, so that the end will readily enter one of the grooves 5 when the wedge is inserted in one of the grooves in the nut. These keys can be driven into the grooves 9 and $9^a$, so that their ends will project into the grooves 5 of the bolt 4. In the opposite face of the nut are dovetail grooves 11 and 12, diametrically oppositely arranged to each other and at right angles to the grooves 9 and $9^a$. These grooves are also for the purpose of receiving a wedge-shaped pin which can be slid therein to engage one of the grooves 5 of the bolt 4, so as to lock the nut and bolt together.

In Figs. 1, 3, and 4 we have shown the preferred form of nut; but in Fig. 2 we have shown the nut applied to an ordinary bolt, which form is particularly desirable as applied to wood structures. In this form the nut will be locked against rotation by driving the pin or wedge 10 in the transverse edge groove 13 and into the wood structure to which the bolt and nut are secured. It will be observed that by providing the vertical groove 6 and the transverse grooves 9, $9^a$, 11, and 12 the nut can be locked substantially in any relative position on the bolt and by merely inserting a pin or wedge the liability of the nut and bolt becoming accidentally separated will be obviated.

Of course it will be obvious that minor changes in form and details of construction can be made without materially departing from the spirit of this invention, and we therefore reserve the right to make such changes and alterations as may properly fall within the scope of this invention.

Having thus fully described the invention, what is claimed as new is—

The combination of a bolt provided with a series of longitudinal grooves, a nut threaded on the bolt and having wedge-shaped grooves in the faces thereof, arranged in diametrical alinement to coincide with the grooves in the bolt, the nut also having a wedge-shaped groove in one edge, and wedge-shaped pins insertible in the wedge-shaped grooves and having their inner ends arranged to respectively engage the grooves of the bolt and a part of the structure against which the nut is applied.

In testimony whereof we affix our signatures in presence of two witnesses.

JAMES A. DOUGLAS.
JAMES BARTLESON.

Witnesses:
MICHAEL MAYERS,
G. W. BAGLEY.